US009061181B2

(12) United States Patent
Okabe

(10) Patent No.: US 9,061,181 B2
(45) Date of Patent: Jun. 23, 2015

(54) GOLF BALL

(71) Applicant: DUNLOP SPORTS CO., LTD., Kobe-shi, Hyogo (JP)

(72) Inventor: Satoko Okabe, Kobe (JP)

(73) Assignee: DUNLOP SPORTS CO. LTD., Kobe (JP)

( * ) Notice: Subject to any disclaimer, the term of this patent is extended or adjusted under 35 U.S.C. 154(b) by 98 days.

(21) Appl. No.: 13/895,855

(22) Filed: May 16, 2013

(65) Prior Publication Data
US 2013/0310196 A1 Nov. 21, 2013

(30) Foreign Application Priority Data

May 17, 2012 (JP) .................................. 2012-113568

(51) Int. Cl.
A63B 37/04 (2006.01)
C08K 5/098 (2006.01)
C08L 9/00 (2006.01)
A63B 37/00 (2006.01)
C08K 5/00 (2006.01)

(52) U.S. Cl.
CPC ......... *A63B 37/0054* (2013.01); *A63B 37/0051* (2013.01); *A63B 37/0063* (2013.01); *A63B 37/0074* (2013.01); *C08K 5/098* (2013.01); *C08K 5/0025* (2013.01)

(58) Field of Classification Search
None
See application file for complete search history.

(56) References Cited

U.S. PATENT DOCUMENTS

| | | | |
|---|---|---|---|
| 4,688,801 A | 8/1987 | Reiter | |
| 4,726,590 A | 2/1988 | Molitor | |
| 4,838,556 A | 6/1989 | Sullivan | |
| 4,844,471 A | 7/1989 | Terence et al. | |
| 4,852,884 A | 8/1989 | Sullivan | |
| 5,018,740 A | 5/1991 | Sullivan | |
| 5,131,662 A * | 7/1992 | Pollitt | 473/372 |
| 5,184,828 A | 2/1993 | Kim et al. | |
| 5,403,010 A | 4/1995 | Yabuki et al. | |
| 5,816,944 A | 10/1998 | Asakura et al. | |
| 5,830,085 A | 11/1998 | Higuchi et al. | |
| 6,056,650 A | 5/2000 | Yamagishi et al. | |
| 6,258,302 B1 | 7/2001 | Nesbitt | |
| 6,277,036 B1 | 8/2001 | Hayashi et al. | |
| 6,302,810 B2 | 10/2001 | Yokota | |
| 6,390,935 B1 | 5/2002 | Sugimoto | |
| 6,390,936 B1 | 5/2002 | Sugimoto | |
| 6,419,595 B1 | 7/2002 | Maruko et al. | |
| 6,596,797 B2 | 7/2003 | Nesbitt | |
| 6,652,393 B1 | 11/2003 | Watanabe | |
| 6,666,780 B2 | 12/2003 | Watanabe | |
| 6,705,956 B1 | 3/2004 | Moriyama et al. | |
| 6,726,579 B2 | 4/2004 | Ohama et al. | |
| 6,762,247 B2 | 7/2004 | Voorheis et al. | |
| 6,815,507 B2 | 11/2004 | Ohama | |
| 6,919,393 B2 | 7/2005 | Mano et al. | |
| 7,086,970 B2 | 8/2006 | Hayashi et al. | |
| 7,300,363 B2 | 11/2007 | Kasashima | |
| 7,329,194 B2 | 2/2008 | Watanabe et al. | |
| 7,344,455 B1 | 3/2008 | Higuchi | |
| 7,682,266 B2 | 3/2010 | Endo et al. | |
| 7,914,397 B2 | 3/2011 | Endo et al. | |
| 8,044,164 B2 | 10/2011 | Shiga et al. | |
| 8,393,978 B2 | 3/2013 | Watanabe et al. | |
| 8,523,707 B2 | 9/2013 | Watanabe et al. | |
| 8,722,752 B2 | 5/2014 | Kuwamura et al. | |
| 8,777,780 B2 | 7/2014 | Kamino et al. | |
| 2001/0026027 A1 | 10/2001 | Nesbitt | |
| 2001/0034412 A1 | 10/2001 | Nesbitt | |
| 2002/0032077 A1 | 3/2002 | Watanabe | |
| 2002/0052254 A1 | 5/2002 | Ichikawa et al. | |
| 2002/0155905 A1 | 10/2002 | Iwami | |
| 2002/0187856 A1 | 12/2002 | Endou | |
| 2003/0104954 A1 * | 6/2003 | Reddy et al. | 508/460 |
| 2003/0114249 A1 | 6/2003 | Voorheis et al. | |
| 2003/0114241 A1 | 6/2003 | Hayashi et al. | |
| 2003/0119606 A1 | 6/2003 | Ohama et al. | |
| 2003/0134946 A1 | 7/2003 | Kataoka | |
| 2003/0144425 A1 | 7/2003 | Mano et al. | |
| 2003/0171165 A1 | 9/2003 | Watanabe | |

(Continued)

FOREIGN PATENT DOCUMENTS

| | | |
|---|---|---|
| EP | 1 358 914 A1 | 11/2003 |
| JP | 61-037178 A | 2/1986 |
| JP | 61-113475 A | 5/1986 |
| JP | 61-253079 A | 11/1986 |
| JP | 61-258844 A | 11/1986 |
| JP | 62-14870 A | 1/1987 |
| JP | 62-82981 A | 4/1987 |
| JP | 6-154357 A | 6/1994 |
| JP | 8-322964 A | 12/1996 |
| JP | 9-313643 A | 12/1997 |
| JP | 10192446 * | 7/1998 |
| JP | 11-9720 A | 1/1999 |
| JP | 11-47309 A | 2/1999 |
| JP | 2000-60999 A | 2/2000 |

(Continued)

OTHER PUBLICATIONS

Dupont, "Hardness Conversion", uploaded May 27, 2014, 1 page, cited in the U.S. Office Action, dated May 30, 2014, for U.S. Appl. No. 13/494,315.

(Continued)

*Primary Examiner* — David Buttner
(74) *Attorney, Agent, or Firm* — Birch, Stewart, Kolasch & Birch, LLP

(57) ABSTRACT

An object of the present invention is to provide a golf ball having a spherical core with an outer-hard inner-soft structure formed from a rubber composition excellent in kneading workability. Another object of the present invention is to provide a golf ball traveling a great flight distance on driver shots. The present invention provides a golf ball having a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a basic metal salt of a fatty acid.

17 Claims, 14 Drawing Sheets

(56) References Cited

U.S. PATENT DOCUMENTS

| | | |
|---|---|---|
| 2003/0207999 A1 | 11/2003 | Higuchi et al. |
| 2003/0208000 A1 | 11/2003 | Higuchi et al. |
| 2004/0106475 A1 | 6/2004 | Sasaki et al. |
| 2004/0110906 A1 | 6/2004 | Fujisawa et al. |
| 2005/0137031 A1 | 6/2005 | Kataoka et al. |
| 2005/0187353 A1 | 8/2005 | Goguen et al. |
| 2006/0019771 A1 | 1/2006 | Kennedy, III et al. |
| 2006/0128900 A1 | 6/2006 | Nanba et al. |
| 2006/0135287 A1 | 6/2006 | Kennedy, III et al. |
| 2006/0178231 A1 | 8/2006 | Kasashima |
| 2007/0012174 A1 | 1/2007 | Fish |
| 2007/0129174 A1 | 6/2007 | Higuchi |
| 2007/0173607 A1 | 7/2007 | Kennedy, III et al. |
| 2007/0281801 A1 | 12/2007 | Watanabe et al. |
| 2007/0281802 A1 | 12/2007 | Watanabe et al. |
| 2008/0020863 A1 | 1/2008 | Higuchi et al. |
| 2008/0020864 A1 | 1/2008 | Shindo et al. |
| 2008/0076603 A1 | 3/2008 | Shindo et al. |
| 2008/0161134 A1 | 7/2008 | Tarao |
| 2008/0194357 A1 | 8/2008 | Higuchi |
| 2008/0194358 A1 | 8/2008 | Higuchi |
| 2008/0194359 A1 | 8/2008 | Higuchi et al. |
| 2008/0214324 A1 | 9/2008 | Nanba et al. |
| 2008/0214325 A1 | 9/2008 | Higuchi et al. |
| 2008/0274835 A1 | 11/2008 | Comeau et al. |
| 2008/0305890 A1 | 12/2008 | Watanabe et al. |
| 2008/0312008 A1 | 12/2008 | Higuchi et al. |
| 2009/0105013 A1 | 4/2009 | Slagel et al. |
| 2009/0111611 A1 | 4/2009 | Kimura et al. |
| 2009/0124757 A1 | 5/2009 | Shindo et al. |
| 2009/0143169 A1 | 6/2009 | Shiga et al. |
| 2009/0227394 A1 | 9/2009 | Bulpett et al. |
| 2010/0009776 A1 | 1/2010 | Okabe et al. |
| 2010/0069175 A1 | 3/2010 | Kamino et al. |
| 2010/0137076 A1 | 6/2010 | Endo et al. |
| 2010/0216905 A1 | 8/2010 | Kuwamura et al. |
| 2010/0273575 A1 | 10/2010 | Watanabe |
| 2010/0298067 A1 | 11/2010 | Watanabe |
| 2010/0304893 A1 | 12/2010 | De Garavilla |
| 2011/0092315 A1 | 4/2011 | Nakamura et al. |
| 2011/0143861 A1 | 6/2011 | Watanabe et al. |
| 2011/0143862 A1 | 6/2011 | Watanabe et al. |
| 2011/0159998 A1 | 6/2011 | Ohama et al. |
| 2011/0300968 A1 | 12/2011 | Ryu et al. |
| 2012/0088604 A1 | 4/2012 | Matsuyama et al. |
| 2012/0172150 A1 | 7/2012 | Mikura et al. |
| 2012/0196699 A1 | 8/2012 | De Garavilla |
| 2012/0329574 A1 | 12/2012 | Mikura et al. |
| 2012/0329575 A1 | 12/2012 | Mikura et al. |
| 2013/0005506 A1 | 1/2013 | Isogawa et al. |
| 2013/0005507 A1 | 1/2013 | Sajima et al. |
| 2013/0005508 A1 | 1/2013 | Matsuyama et al. |
| 2013/0017905 A1 | 1/2013 | Shindo et al. |
| 2013/0053182 A1 | 2/2013 | Tarao et al. |
| 2013/0065707 A1 | 3/2013 | Matsuyama |
| 2013/0123044 A1 | 5/2013 | Mikura et al. |
| 2013/0123045 A1 | 5/2013 | Watanabe et al. |
| 2013/0172111 A1 | 7/2013 | Sakamine et al. |
| 2013/0244810 A1 | 9/2013 | Mikura et al. |
| 2013/0288824 A1 | 10/2013 | Isogawa et al. |
| 2013/0303307 A1 | 11/2013 | Sakamine et al. |
| 2013/0316850 A1 | 11/2013 | Inoue et al. |
| 2013/0324631 A1 | 12/2013 | Kuwamura et al. |

FOREIGN PATENT DOCUMENTS

| | | |
|---|---|---|
| JP | 2000-84118 A | 3/2000 |
| JP | 2000-245873 A | 9/2000 |
| JP | 2000-271248 A | 10/2000 |
| JP | 2001-17569 A | 1/2001 |
| JP | 2002-764 A | 1/2002 |
| JP | 2002-540821 A | 12/2002 |
| JP | 2003-135627 A | 5/2003 |
| JP | 2003-164546 A | 6/2003 |
| JP | 2003-180872 A | 7/2003 |
| JP | 2003-226782 A | 8/2003 |
| JP | 2003-320054 A | 11/2003 |
| JP | 2003-320055 A | 11/2003 |
| JP | 2003-325703 A | 11/2003 |
| JP | 2004-73856 A | 3/2004 |
| JP | 2004-167052 A | 6/2004 |
| JP | 2005-179522 A | 7/2005 |
| JP | 2006-34740 A | 2/2006 |
| JP | 2006-218294 A | 8/2006 |
| JP | 2006-297108 A | 11/2006 |
| JP | 2007-152090 A | 6/2007 |
| JP | 2007-319660 A | 12/2007 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-11431 A | 1/2009 |
| JP | 2009-11436 A | 1/2009 |
| JP | 2009-119256 A | 6/2009 |
| JP | 2009-131508 A | 6/2009 |
| JP | 2010-68997 A | 4/2010 |
| JP | 2010-162323 A | 7/2010 |
| JP | 2010-253268 A | 11/2010 |
| JP | 2011-83395 A | 4/2011 |
| JP | 2011-120898 A | 6/2011 |
| JP | 2011-255172 A | 12/2011 |
| KR | 10-0995019 B1 | 11/2010 |
| WO | WO 2009/051114 A1 | 4/2009 |

OTHER PUBLICATIONS

Examiner's Calc. JIS-C hardness converted by Dupont, May 27, 2014, cited in the U.S. Office Action, dated May 30, 2014, for U.S. Appl. No. 13/494,315.

* cited by examiner

GOLF BALL

FIELD OF THE INVENTION

The present invention relates to an improvement of a core of a golf ball.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 A and 2009-119256 A disclose a technique of enhancing resilience of the core. Japanese Patent Publication No. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D harness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q)-(S)] | 1 to 10 |
| Hardness difference [(S)-(R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D harness |
|---|---|
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C units being within ±2; and the envelope layer, intermediate layer and cover have hardness which satisfy the condition: cover hardness>intermediate layer hardness>envelope layer hardness.

SUMMARY OF THE INVENTION

The inventors of the present invention have found that a spherical core formed from a rubber composition containing (a) a base rubber, (b) an α,β-unsaturated carboxylic acid having 3 to 8 carbon atoms and/or a metal salt thereof, (c) a crosslinking initiator, and (d) a specific carboxylic acid and/or a salt thereof has hardness distribution where the hardness increases linearly or almost linearly from a center of the core toward a surface thereof, and have filed patent applications. The spherical core having a hardness distribution where the hardness increases linearly or almost linearly from the center of the core toward the surface thereof lowers a spin rate on driver shots, thereby providing a great flight distance.

The reason why the hardness of the core increases linearly or almost linearly from the center of the core toward the surface thereof is considered as follows. The metal salt of (b) the α,β-unsaturated carboxylic acid having 3 to 8 carbon atoms blended in the rubber composition is considered to form an ion cluster in the core, thereby crosslinking the rubber molecules with metals. By blending (d) the specific acid and/or the salt thereof into this rubber composition, (d) the specific acid and/or the salt thereof exchanges a cation with the ion cluster formed by the metal salt of (b) the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the core central part where the temperature is high, and less occurs toward the core surface. When molding a core, the internal temperature of the core is high at the core central part and decreases toward the core surface, since reaction heat from a crosslinking reaction of the base rubber accumulates at the core central part. In other words, the breaking of the metal crosslinking by (d) the specific carboxylic acid and/or the salt thereof easily occurs at the core central part, but less occurs toward the surface. As a result, it is conceivable that since a crosslinking density in the core increases from the center of the core toward the surface thereof, the core hardness increases linearly or almost linearly from the center of the core toward the surface thereof.

However, when kneading the carboxylic acid and/or the salt thereof, the base rubber, and the like with a kneader, there were cases where the obtained spherical core did not exhibit the desired hardness distribution, because the blend was attached to the wall or the rotor of the kneader. Further, even if only (a) the base rubber and (d) the carboxylic acid and/or the salt thereof are kneaded, it is difficult to blend homogenously. On the other hand, when blending using a roll mill, there was a problem of taking a quite long time for the blending.

The present invention has been achieved in view of the above circumstances. An object of the present invention is to provide a golf ball comprising a spherical core having an outer-hard inner-soft structure and formed from a core rubber composition excellent in kneading workability. Another object of the present invention is to provide a golf ball traveling a great flight distance on driver shots.

The present invention provides a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or the metal salt thereof, (c) a crosslinking initiator, and (d) a basic metal salt of a fatty acid. In the present invention, a basic metal salt of a fatty acid is used instead of a carboxylic acid and/or a salt thereof. Use of the basic metal salt of the fatty acid improves kneading workability of a rubber composition as well as provides a spherical core with an outer-hard inner-soft structure.

The present invention provides a spherical core having an outer-hard inner-soft structure and formed from a core rubber composition excellent in kneading workability. The golf ball having the spherical core with the outer-hard inner-soft structure produces a lower spin rate on driver shots, thereby traveling a great flight distance.

DESCRIPTION OF THE PREFERRED EMBODIMENT

Figure 1:
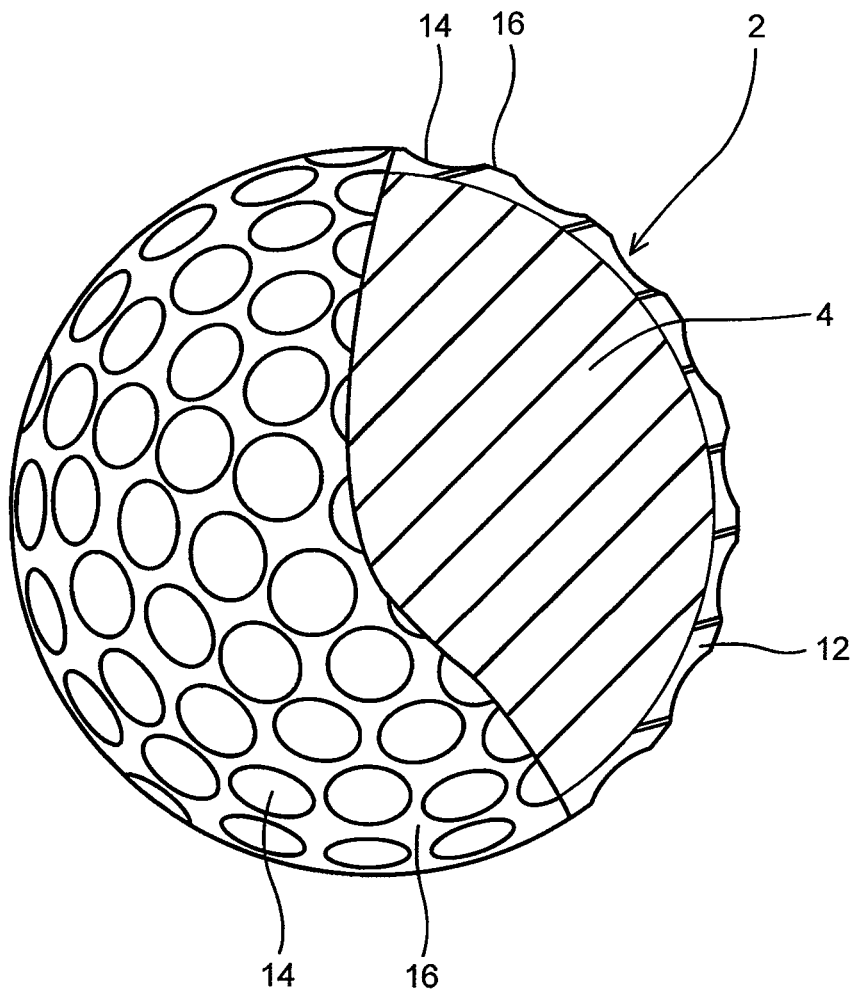
FIG. 1 is a partially cutaway view of the golf ball of the preferred embodiment of the present invention.
Figure 2:
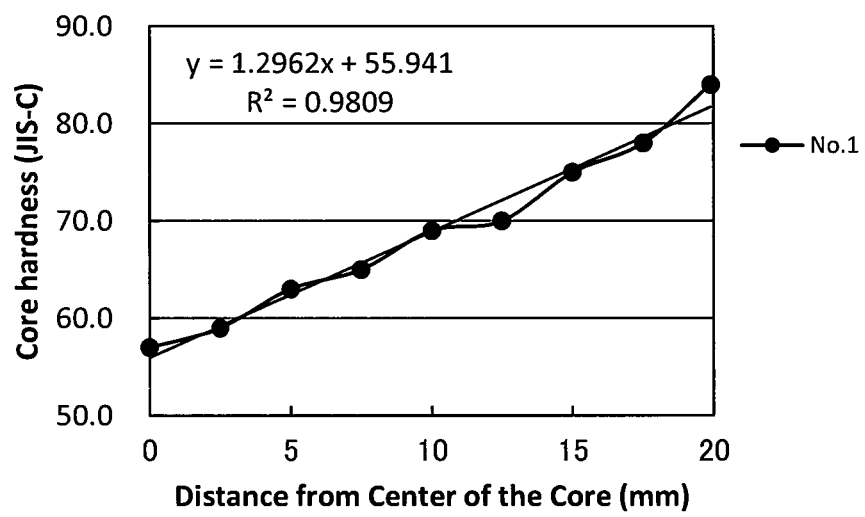
FIG. 2 is a graph showing the hardness distribution of the core.
Figure 3:
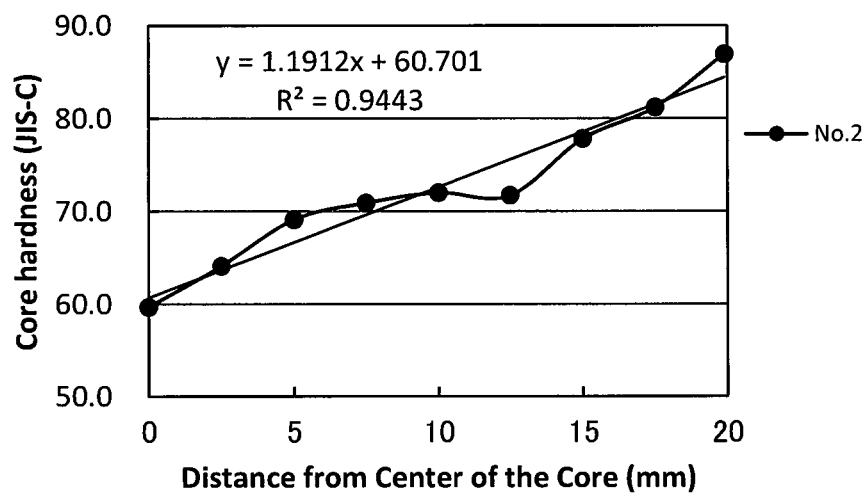
FIG. 3 is a graph showing the hardness distribution of the core.
Figure 4:
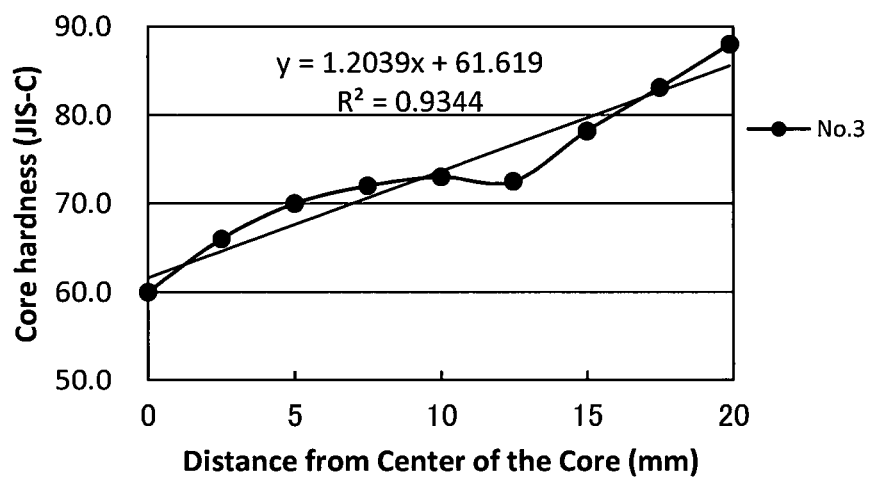
FIG. 4 is a graph showing the hardness distribution of the core.
Figure 5:
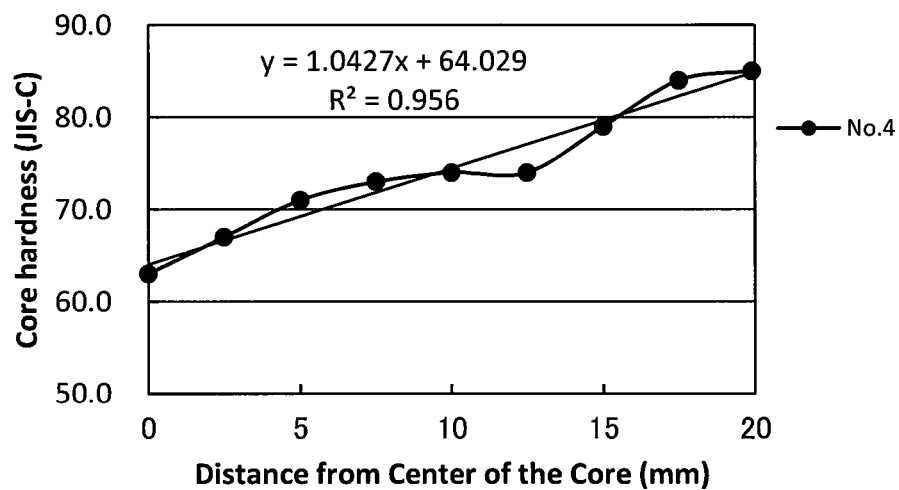
FIG. 5 is a graph showing the hardness distribution of the core.
Figure 6:
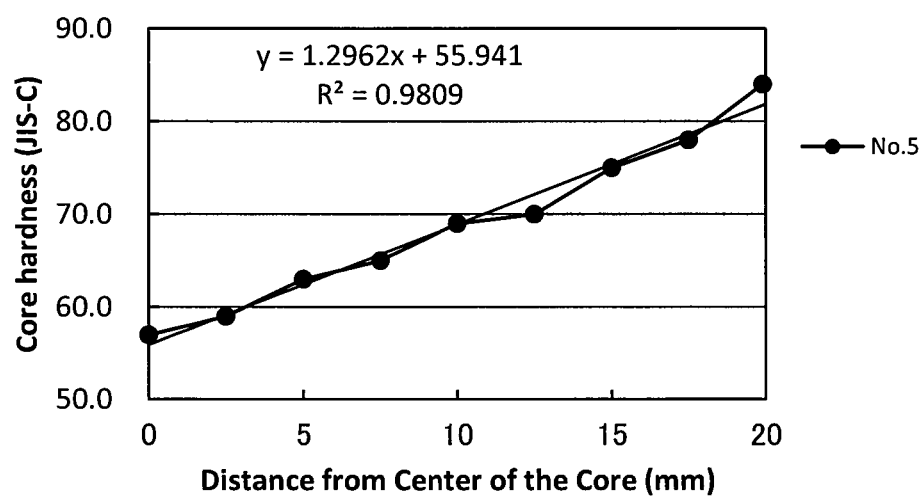
FIG. 6 is a graph showing the hardness distribution of the core.
Figure 7:
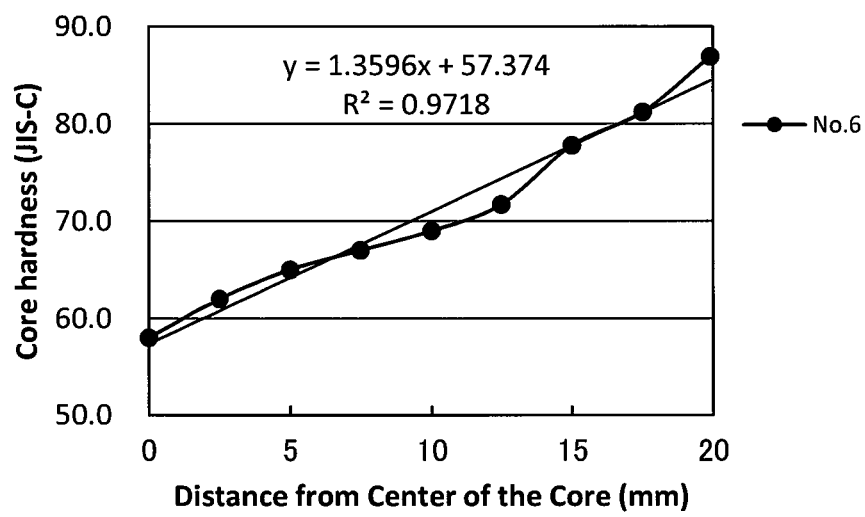
FIG. 7 is a graph showing the hardness distribution of the core.
Figure 8:
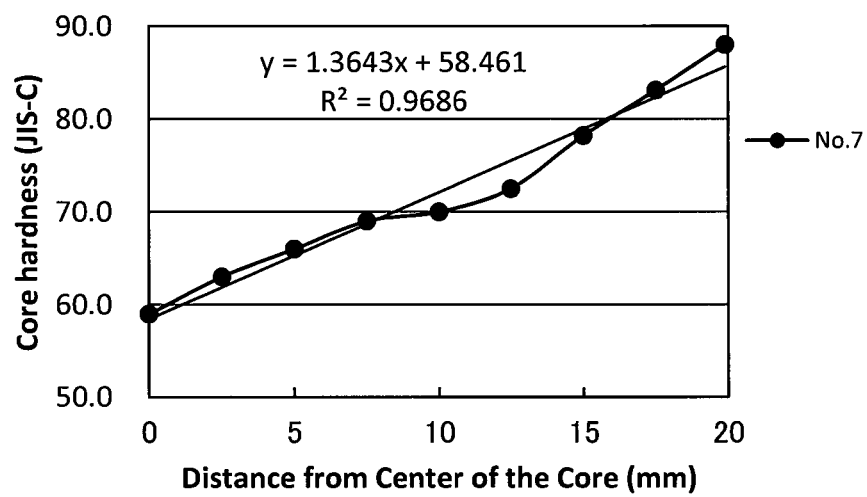
FIG. 8 is a graph showing the hardness distribution of the core.
Figure 9:
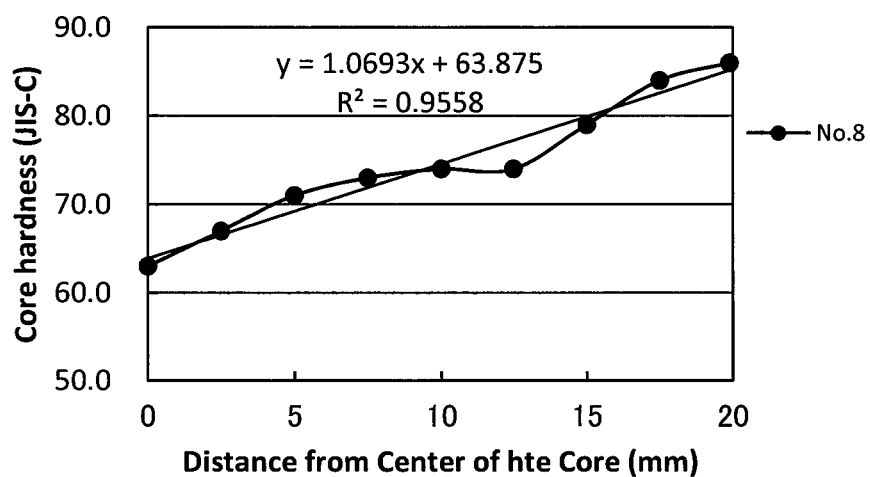
FIG. 9 is a graph showing the hardness distribution of the core.
Figure 10:
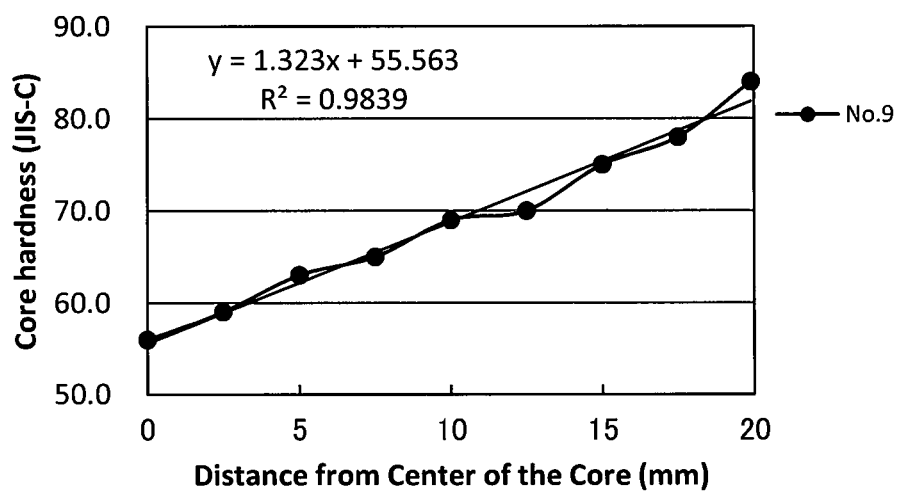
FIG. 10 is a graph showing the hardness distribution of the core.
Figure 11:
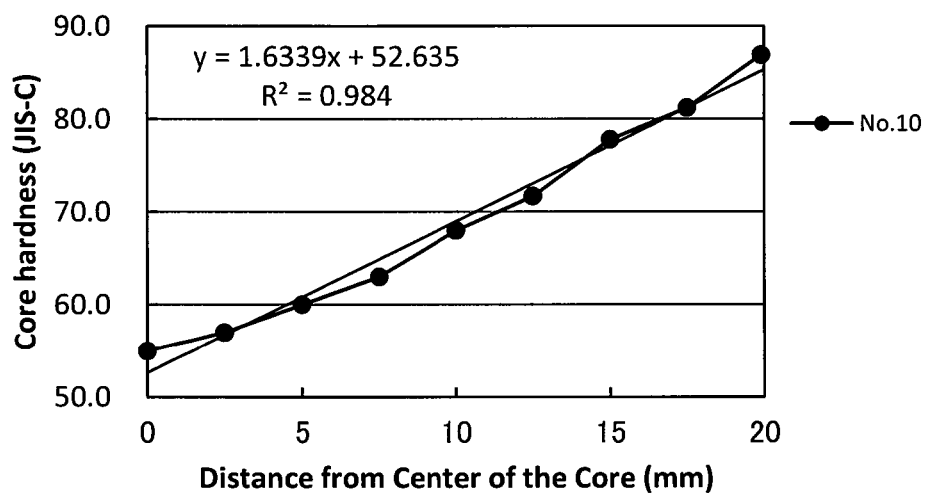
FIG. 11 is a graph showing the hardness distribution of the core.
Figure 12:
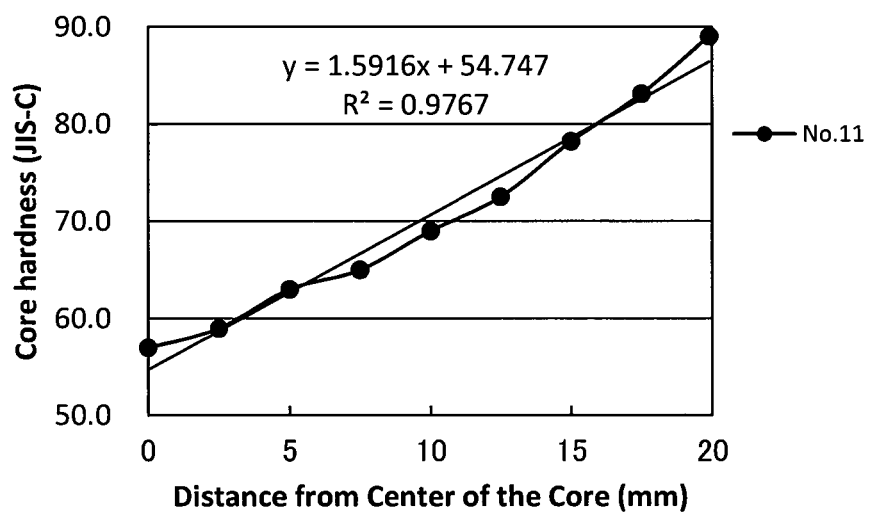
FIG. 12 is a graph showing the hardness distribution of the core.
Figure 13:
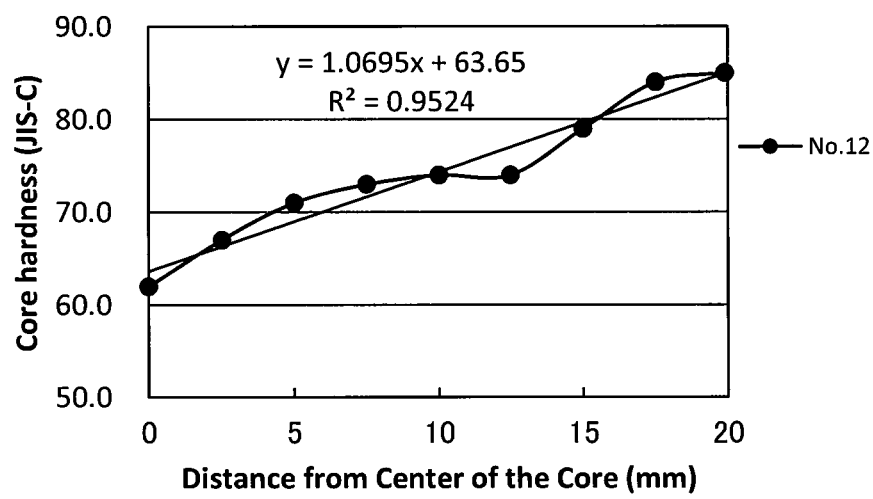
FIG. 13 is a graph showing the hardness distribution of the core.
Figure 14:
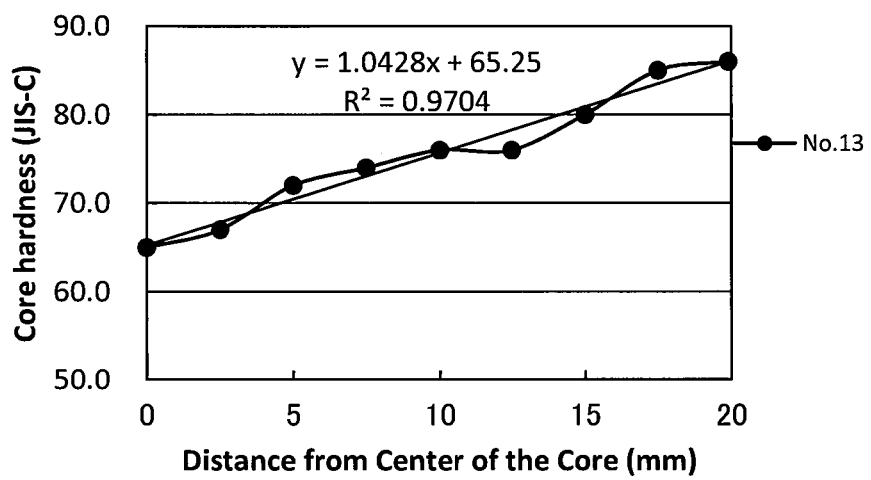
FIG. 14 is a graph showing the hardness distribution of the core.

The present invention provides a golf ball comprising a spherical core and at least one cover layer, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a basic metal salt of a fatty acid.

(1) Rubber Composition

First, (a) the base rubber used in the present invention will be described. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Typically preferred of them is the high cis-polybutadiene having a cis-1,4 bond in a proportion of 40% or more, more preferably 80% or more, even more preferably 90% more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or a metal salt thereof will be described. (b) The α,β-unsaturated carboxylic acid having 3 to 8 carbon atoms and/or a metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably contains (e) the metal compound. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used.

The α,β-unsaturated carboxylic acid having 3 to 8 carbon atoms includes, for example, acrylic acid, methacrylic acid, fumaric acid, maleic acid, crotonic acid, and the like.

Examples of the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as tin, zirconium or the like. The above metal ions can be used solely or as a mixture of at least two of them. Of these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 10 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the content of (b) the α,β-unsaturated carboxylic acid having 3 to 8 carbon atoms and/or the metal salt thereof is less than 10 parts by mass, the content of (c) the crosslinking initiator which will be described below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Dicumyl peroxide is preferably used of them.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

Next, (d) the basic metal salt of the fatty acid is described. The basic metal salt of the fatty acid is obtained by a well-known producing method where a fatty acid is allowed to react with a metal oxide or metal hydroxide. A general metal salt of a fatty acid is obtained by a reaction of a fatty acid with a metal oxide or metal hydroxide in an amount of the reaction equivalent, whereas a basic metal salt of a fatty acid is obtained by adding a metal oxide or metal hydroxide in an excessive amount which is larger than the reaction equivalent to a fatty acid. The metal content, melting point or the like of the product are different from those of a general metal salt of a fatty acid.

As (d) the basic metal salt of the fatty acid, preferred is a basic metal salt of a fatty acid represented by the following general formula (1).

$$mM^1O \cdot M^2(RCOO)_2 \qquad (1)$$

In formula (1), m represents the number of moles of metal oxides or metal hydroxides in the basic metal salt of the fatty acid. m preferably ranges from 0.1 to 2.0. If m is less than 0.1, the workability may be lowered when kneading the materials, while if m exceeds 2.0, the melting point of the basic metal salt of the fatty acid becomes too high and thus the dispersibility to the rubber composition may become low. As $M^1$ and $M^2$, the group II or the group XII metals of the periodic table are preferred, respectively. $M^1$ and $M^2$ may be identical or different each other. Examples of the group II metals include beryllium, magnesium, calcium, strontium and barium. Examples of the group XII metals include zinc, cadmium and mercury. Preferred is, for example, magnesium, calcium, barium or zinc, and more preferred is zinc, as $M^1$ and $M^2$ metals.

In formula (1), RCOO means the residue of the saturated fatty acid or unsaturated fatty acid. Specific examples of the saturated fatty acid component of (d) the basic metal salt of the fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid component of (d) the basic metal salt of the fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of the fatty acid component of (d) the basic metal salt of the fatty acid (Common name) are, for example, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

(d) The basic metal salt of the fatty acid is preferably a basic metal salt of a saturated fatty acid. (d) The basic metal salt of the fatty acid preferably includes a basic metal salt of a fatty acid having 4 to 22 carbon atoms, and more preferably a basic metal salt of a fatty acid having 5 to 18 carbon atoms. Specific examples of (d) the basic metal salt of the fatty acid include basic magnesium caprylate, basic calcium caprylate, basic zinc caprylate, basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. (d) The basic metal salt of the fatty acid preferably includes a basic zinc fatty acid, and more preferably basic zinc stearate, basic zinc laurate, and basic zinc caprylate. (d) The basic metal salt of the fatty acid may be used alone or as a mixture of at least two of them.

There is no particular limitation on the melting point of (d) the basic metal salt of the fatty acid, but if the metal is magnesium, the melting point is preferably 100° C. or more, and is preferably 300° C. or less, more preferably 290° C. or less, even more preferably 280° C. or less. If the metal is zinc, the melting point is preferably 100° C. or more, and is preferably 300° C. or less, more preferably 290° C. or less, even more preferably 280° C. or less. If the melting point falls within the above range, attachment of (d) the basic metal salt of the fatty acid to a kneading machine (such as the wall or the roller of the kneader) during the kneading is suppressed, and thus the kneading of (a) the base rubber and (d) the basic metal salt of the fatty acid is conducted successfully.

The content of (d) the basic metal salt of the fatty acid is preferably 0.5 part by mass or more, more preferably 1.0 part by mass or more, even more preferably 2.0 parts by mass or more, and is preferably 30 parts by mass or less, more preferably 25 parts by mass or less, even more preferably 20 parts by mass or less with respect to 100 parts by mass of (a) the base rubber. If the content of (d) the basic metal salt of the fatty acid is too little, the effect of adding (d) the basic metal salt of the fatty acid is not sufficient, and thus the degree of the outer-hard inner-soft structure of the spherical core may be decreased. On the other hand, if the content is too much, the resilience of the core may be lowered, since the hardness of the resultant core may be lowered as a whole.

In the case that the rubber composition used in the present invention contains only the α,β-unsaturated carboxylic acid having 3 to 8 carbon atoms as the co-crosslinking agent, the rubber composition preferably contains (e) a metal compound. (e) The metal compound is not limited as long as it can neutralize (b) the α,β-unsaturated carboxylic acid having 3 to 8 carbon atoms in the rubber composition, but (d) the basic metal salt of the fatty acid is not included. (e) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Of these, (e) the metal compound preferably includes a divalent metal compound, more preferably includes a zinc compound. The divalent metal compound reacts with the $\alpha,\beta$-unsaturated carboxylic acid having 3 to 8 carbon atoms, thereby forming a metal crosslinking. Use of the zinc compound provides a golf ball with excellent resilience. (e) These metal compounds are used solely or as a mixture of at least two of them. The content of (e) the metal compound may be adjusted according to the desired degree of neutralization of (b) the $\alpha,\beta$-unsaturated carboxylic acid having 3 to 8 carbon atoms.

The rubber composition of the present invention preferably further contains (f) an organic sulfur compound. In the present invention, by using (f) the organic sulfur compound and (d) the basic metal salt of the fatty acid in combination for the core rubber composition, the degree of the outer-hard and inner-soft structure of the core can be controlled, while maintaining approximate linearity of the core hardness distribution. (f) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (f) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (f) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the spherical core, (f) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel (II), zirconium (II), and tin (II).

Examples of the thiophenols include, for example, thiophenol; thiophenols substituted with a fluoro group, such as 4-fluorothiophenol, 2,5-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the naphthalenethiols (thionaphthols) are 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol and metal salts thereof. Preferable examples include 1-naphthalenethiol, 2-naphthalenethiol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl) mercaptobenzothiazole, and 2-(2,6-diethyl-4-morpholinothio)benzothiazole.

(f) The organic sulfur compound can be used solely or as a mixture of at least two of them.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience may not improve. If the content of (f) the organic sulfur compound exceeds 5.0 parts by mass, the compression deformation amount of the obtained golf ball becomes large and thus the resilience may be lowered.

The rubber composition used in the present invention may contain additives such as a pigment, a filler for adjusting weight or the like, an antioxidant, a peptizing agent, and a softener, where necessary. Further, as described above, if the rubber composition used in the present invention contains only the $\alpha,\beta$-unsaturated carboxylic acid having 3 to 8 carbon atoms as a crosslinking agent, the rubber composition preferably further contains (e) the metal compound.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as an final product. The filler may be blended where necessary. The filler includes, for example, inorganic fillers such as zinc oxide, barium sulfate, calcium carbonate, magnesium oxide, tungsten powder, molybdenum powder, or the like. The filler more preferably includes zinc oxide. It is considered that zinc oxide functions as a vulcanization aid to enhance the hardness of the whole core. The content of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight ratio of the rubber component becomes small and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

(2) Cover Composition

The golf ball cover of the present invention is formed from a cover composition containing a resin component. Examples of the resin component include, for example, an ionomer rein; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

The ionomer resin includes a product prepared by neutralizing at least a part of carboxyl groups in the binary copolymer composed of an olefin and an $\alpha,\beta$-unsaturated carboxylic acid having 3 to 8 carbon atoms with a metal ion, a product prepared by neutralizing at least a part of carboxyl groups in the ternary copolymer composed of an olefin, an $\alpha,\beta$-unsaturated carboxylic acid having 3 to 8 carbon atoms, and an $\alpha,\beta$-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the $\alpha,\beta$-unsaturated carboxylic acid having 3 to 8 carbon atoms are acrylic acid, methacrylic acid, fumaric acid, maleic acid and crotonic acid. Of these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Of these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins.

The cover composition constituting the cover of the golf ball of the present invention preferably includes, as a resin component, a thermoplastic polyurethane elastomer or an ionomer resin. In case of using the ionomer resin, it is preferred to use a thermoplastic styrene elastomer together. The content of the polyurethane or ionomer resin in the resin component of the cover composition is preferably 50 mass % or more, more preferably 60 mass % or more, even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The amount of the white pigment (for example, titanium oxide) is preferably 0.5 part or more, more preferably 1 part or more, and the amount of the white pigment is preferably 10 parts or less, more preferably 8 parts or less, with respect to 100 parts of the resin component constituting the cover by mass. If the amount of the white pigment is 0.5 part by mass or more, it is possible to impart the opacity to the resultant cover. Further, if the amount of the white pigment is more than 10 parts by mass, the durability of the resultant cover may deteriorate.

(3) Method for Producing Golf Balls

The rubber composition of the present invention is obtained by mixing and kneading (a) the base rubber, (b) the $\alpha,\beta$-unsaturated carboxylic acid having 3 to 8 carbon atoms and/or the metal salt thereof, (c) the crosslinking initiator, (d)

the basic metal salt of the fatty acid, and other additives where necessary. The method of the kneading is not limited, and may be conducted using a known kneading machine such as a kneading roll mill, a banbury mixer, a kneader, and the like.

The spherical core of the golf ball of the present invention can be obtained by molding the rubber composition after kneaded. The temperature for molding the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the cover materials such as the base resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the core is placed in the mold, held with the protruding hold pin, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 second to 5 seconds, and after cooling for 10 seconds to 60 seconds, the mold is opened.

After the cover is molded, the mold is opened and the golf ball body is taken out from the mold, and where necessary, the golf ball body is preferably subjected to surface treatments such as deburring, cleaning, and sandblast. If desired, a paint film or a mark may be formed.

(4) Golf Ball Construction

The golf ball construction of the inventive golf ball is not limited, as long as the golf ball has a spherical core and at least one cover layer covering the spherical core. The spherical core preferably has a single layered structure. Unlike the multi-layered structure, the spherical core of the single layered structure does not have an energy loss at the interface of the multi-layered structure when hitting, and thus has an improved resilience. The cover has a structure of at least one layer, for example a single layered structure, or a multi-layered structure of at least two layers.

The golf ball of the present invention includes, for example, a two-piece golf ball comprising a spherical core and a single layered cover disposed around the spherical core, a multi-piece golf ball comprising a spherical core, and at least two cover layers disposed around the spherical core (including the three-piece golf ball), and a wound golf ball comprising a spherical core, a rubber thread layer which is formed around the spherical core, and a cover disposed over the rubber thread layer. The present invention can be suitably applied to any one of the above golf balls. If the golf ball of the present invention has a multi-layer cover, the cover disposed between the outermost layer and the spherical core may be referred to as an intermediate layer or inner layer cover.

FIG. 1 is a partially cutaway sectional view showing the golf ball 2 according to the preferable embodiment of the present invention. The golf ball 2 comprises a spherical core 4, and a cover 12 covering the spherical core 4. Plurality of dimples 14 are formed on a surface of the cover. Other portions than dimples 14 on the surface of the golf ball 2 are referred to as "land 16". The golf ball 2 is provided with a paint layer and a mark layer outside the cover 12, but these layers are not depicted.

The spherical core preferably has such a hardness distribution that $R^2$ of a linear approximate curve determined by a least-squares method is 0.93 or more, when plotting JIS-C hardness measured at a center, a surface and at intervals of 2.5 mm from the center of the spherical core, versus distances from the center of the spherical core. If $R^2$ is 0.93 or higher, it means that the hardness distribution of the spherical core is linear or almost linear. A golf ball with a spherical core having a linear or almost linear hardness distribution exhibits a reduced spin rate upon driver shots and middle iron shots, thereby providing a greater flight distance.

The spherical core was cut into two hemispheres to obtain a cut plane, and the hardness of the spherical core were measured at the central point and at intervals of 2.5 mm from the central point along the arbitrary radius of the spherical core. Although the number of measuring points changes depending upon the radius of the spherical core, the hardness distribution of the whole core is obtained by measuring the hardness at intervals of 2.5 mm. Further, the hardness at the surface of the spherical core is measured. Next, the JIS-C hardness measured as described above is assigned to the vertical axis and the distance (mm) from the core center is assigned to the horizontal axis, and measurement results are plotted therein to create a graph. In the present invention, $R^2$ of a linear approximation curve obtained from this plot by the least square method is preferably 0.93 or higher. $R^2$ of a linear approximation curve obtained by the least square method is an index representing the linearity of an obtained plot. In the present invention, if $R^2$ is 0.93 or higher, it means that the hardness distribution of the spherical core is linear or almost linear. A golf ball with a spherical core having a linear or almost linear hardness distribution exhibits a reduced spin rate upon driver shots and middle iron shots. As a result, a flight distance on driver shots and middle iron shots increases.

$R^2$ of the linear approximation curve is preferably 0.94 or higher. Increasing the linearity provides a greater flight distance on driver shots and middle iron shots.

The spherical core preferably has a hardness difference (Hs−Ho) between a surface hardness Hs and a center hardness Ho of 18 or more, more preferably 20 or more, even more preferably 22 or more, and preferably has a hardness difference of 80 or less, more preferably 70 or less, even more preferably 60 or less in JIS-C hardness. If the hardness difference between the center hardness and the surface hardness is large, the golf ball having a great flight distance due to the high launch angle and low spin rate is obtained. On the other hand, if the hardness difference is too large, the durability of the obtained golf ball may be lowered.

The spherical core preferably has the center hardness Ho of 30 or more, more preferably 40 or more, even more preferably 45 or more in JIS-C hardness. If the center hardness Ho is less than 30 in JIS-C hardness, the core becomes too soft and thus the resilience may be lowered. Further, the spherical core preferably has the center hardness Ho of 80 or less, more preferably 75 or less, even more preferably 70 or less in JIS-C hardness. If the center hardness Ho exceeds 80 in JIS-C hardness, the core becomes too hard and thus the shot feeling tends to be lowered.

The spherical core preferably has the surface hardness Hs of 72 or more, more preferably 74 or more, even more preferably 76 or more, and preferably has the surface hardness Hs of 100 or less, more preferably 95 or less in JIS-C hardness. If the surface hardness is 76 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is provided.

The spherical core preferably has the diameter of 34.8 mm or more, more preferably 36.8 mm or more, and even more preferably 38.8 mm or more, and preferably has the diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin, and thus the cover functions better.

When the spherical core has a diameter from 34.8 mm to 42.2 mm, a compression deformation amount (shrinking deformation amount of the spherical core along the compression direction) of the spherical core when applying a load from 98 N as an initial load to 1275 N as a final load is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. In case of a plurality of cover layers, it is preferred that the total thickness of the cover layers falls within the above range.

The slab hardness of the cover composition is preferably determined in accordance with the constituent members of the golf ball and the desired performance of the golf balls. For example, in case of a so-called distance golf ball which focuses on a flight distance, the cover composition constituting the outermost cover layer (hereinafter, sometimes may be merely referred to as "outermost cover layer composition") preferably has a slab hardness of 50 or more, more preferably 55 or more, and preferably has a slab hardness of 80 or less, more preferably 70 or less in Shore D hardness. If the outermost cover layer composition has a slab hardness of 50 or more, the obtained golf ball has a high launch angle and low spin rate on driver shots and iron shots, and thus the flight distance becomes large. If the outermost cover layer composition has a slab hardness of 80 or less, the golf ball excellent in durability is obtained. Further, in case of a so-called spin golf ball which focuses on controllability, the outermost cover layer composition preferably has a slab hardness of less than 50, and preferably has a slab hardness of 20 or more, more preferably 25 or more in Shore D hardness. If the outermost cover layer composition has a slab hardness of less than 50, the flight distance on driver shots can be improved by the core of the present invention, as well as the obtained golf ball readily stops on the green due to the high spin rate on approach shots. If the outermost cover layer composition has a slab hardness of 20 or more, the abrasion resistance improves.

In case of a plurality of cover layers, the cover composition constituting the intermediate layer or inner cover layer (hereinafter, sometimes may be merely referred to as "inner cover layer composition") preferably has a slab hardness of 30 or more, more preferably 35 or more, more preferably 40 or more, and preferably has a slab hardness of 80 or less, more preferably 75 or less, even more preferably 70 or less in Shore D hardness. If the slab hardness of the inner layer cover composition is 30 or more in Shore D hardness, the rigidity of the intermediate layer or inner cover layer enhances and thus the golf ball with an excellent resilience is obtained. If the slab hardness of the inner cover layer composition is 80 or less in Shore D hardness, the durability of the obtained golf ball improves.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

It is preferred that a paint film is formed on a surface of the golf ball body. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus exhibits the good shot feeling. On the other hand, if the compression deformation amount is 5.0 mm or less, the resilience is enhanced.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Compression Deformation Amount (mm)

A compression deformation amount of the core or golf ball (a shrinking amount of the core or golf ball in the compression direction thereof), when applying a load from 98 N as an initial load to 1275 N as a final load to the core or golf ball, was measured.

(2) Coefficient of Restitution

A 198.4 g of metal cylindrical object was allowed to collide with each core or golf ball at a speed of 40 m/sec, and the speeds of the cylindrical object and the core or golf ball before and after the collision were measured. Based on these speeds and the mass of each object, coefficient of restitution for each core or golf ball was calculated. The measurement was conducted by using twelve samples for each core or golf ball, and the average value was regarded as the coefficient of restitution for the core or golf ball. The coefficient of restitution of golf balls (core) is shown as the difference from that of golf ball (core) No. 13.

(3) Slab Hardness (Shore D Hardness)

Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(4) Hardness Distribution of Spherical Core (JIS-C Hardness)

A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness were measured at the central point and at predetermined distances from the central point. The core hardness were measured at 4 points at predetermined distances from the central point of the cut plane of the core. The core hardness was calculated by averaging the hardness measured at 4 points.

(5) Flight Distance (m) and Spin Rate (Rpm) on a Driver Shot

A metal-headed W#1 driver (XXIO S, loft: 11°, manufactured by SRI Sports Limited) was installed on a swing robot M/C manufactured by Golf Laboratories, Inc. A golf ball was hit at a head speed of 40 m/sec, and the flight distance (the distance from the launch point to the stop point) and the spin rate right after hitting the golf ball were measured. This measurement was conducted twelve times for each golf ball, and the average value was adopted as the measurement value for the golf ball. A sequence of photographs of the golf ball right after hitting were taken for measuring the spin rate (rpm). The flight distance and spin rate of golf balls (core) are shown as the difference from those of golf ball (core) No. 13.

[Production of Cores]

The rubber compositions having formulations shown in Table 3 and 4 were kneaded and heat-pressed in upper and lower molds, each having a hemispherical cavity, at 170° C. for 20 minutes to prepare spherical cores having a diameter of 39.8 m.

TABLE 3

|  |  | Golf ball No. | | | | | |
|---|---|---|---|---|---|---|---|
|  |  | 1 | 2 | 3 | 4 | 5 | 6 |
| Rubber composition (parts by mass) | BR730 | 100 | 100 | 100 | 100 | 100 | 100 |
|  | Basic zinc stearate | 35 | 10 | 5 | 0.1 | — | — |
|  | Basic zinc laurate | — | — | — | — | 35 | 10 |
|  | Basic zinc caprylate | — | — | — | — | — | — |
|  | Zinc stearate | — | — | — | — | — | — |
|  | Zinc oxide | 5 | 5 | 5 | 5 | 5 | 5 |
|  | Zinc acrylate | 42 | 30 | 27 | 23 | 42 | 30 |
|  | Barium sulfate | *1) | *1) | *1) | *1) | *1) | *1) |
|  | Thionaphthol | 0.2 | 0.2 | 0.2 | 0.2 | 0.2 | 0.2 |
|  | Dicumyl peroxide | 0.8 | 0.8 | 0.8 | 0.8 | 0.8 | 0.8 |
| Core hardness distribution (JIS-C) | Core center hardness | 57.0 | 59.7 | 60.0 | 63.0 | 57.0 | 58.0 |
|  | 2.5 mm | 59.0 | 64.1 | 66.0 | 67.0 | 59.0 | 62.0 |
|  | 5.0 mm | 63.0 | 69.1 | 70.0 | 71.0 | 63.0 | 65.0 |
|  | 7.5 mm | 65.0 | 70.9 | 72.0 | 73.0 | 65.0 | 67.0 |
|  | 10 mm | 69.0 | 72.0 | 73.0 | 74.0 | 69.0 | 69.0 |
|  | 12.5 mm | 70.0 | 71.7 | 72.5 | 74.0 | 70.0 | 71.7 |
|  | 15.0 mm | 75.0 | 77.8 | 78.2 | 79.0 | 75.0 | 77.8 |
|  | 17.5 mm | 78.0 | 81.2 | 83.1 | 84.0 | 78.0 | 81.2 |
|  | Surface hardness | 84.0 | 86.9 | 88.0 | 85.0 | 84.0 | 86.9 |
|  | Surface hardness − center hardness | 27.0 | 27.2 | 28.0 | 22.0 | 27.0 | 28.9 |
|  | $R^2$ of approximated curve | 0.98 | 0.94 | 0.93 | 0.96 | 0.98 | 0.97 |
|  | Slope of approximated curve | 1.30 | 1.19 | 1.20 | 1.04 | 1.30 | 1.36 |
| Core coefficient of restitution |  | −0.009 | 0.000 | 0.000 | 0.000 | −0.008 | 0.000 |
| Core compression deformation (mm) |  | 3.38 | 3.33 | 3.32 | 3.30 | 3.37 | 3.32 |

TABLE 3-continued

|  |  | Golf ball No. | | | | | |
|---|---|---|---|---|---|---|---|
|  |  | 1 | 2 | 3 | 4 | 5 | 6 |
| Intermediate layer hardness (Shore D) | | 65 | 65 | 65 | 65 | 65 | 65 |
| Intermediate layer thickness (mm) | | 1.0 | 1.0 | 1.0 | 1.0 | 1.0 | 1.0 |
| Cover hardness (Shore D) | | 32 | 32 | 32 | 32 | 32 | 32 |
| Cover thickness (mm) | | 0.5 | 0.5 | 0.5 | 0.5 | 0.5 | 0.5 |
| Evaluation | Workability | Poor | Good | Good | Good | Poor | Good |
|  | Attachment to kneader | Yes | No | No | No | Yes | No |
|  | Compression deformation amount (mm) | 2.80 | 2.75 | 2.75 | 2.73 | 2.80 | 2.75 |
|  | Spin rate on driver shots (rpm) | −150 | −150 | −150 | −50 | −150 | −200 |
|  | Flight distance on driver shots (m) | −7.0 | 2.0 | 2.0 | 1.0 | −6.0 | 2.0 |

*1) As to an amount of barium sulfate, adjustment was made such that the golf ball had a mass of 45.4 g.

TABLE 4

|  |  | Golf ball No. | | | | | | |
|---|---|---|---|---|---|---|---|---|
|  |  | 7 | 8 | 9 | 10 | 11 | 12 | 13 |
| Rubber composition (parts by mass) | BR730 | 100 | 100 | 100 | 100 | 100 | 100 | 100 |
|  | Basic zinc stearate | — | — | — | — | — | — | — |
|  | Basic zinc laurate | 5 | 0.1 | — | — | — | — | — |
|  | Basic zinc caprylate | — | — | 35 | 5 | 2.5 | 0.1 | — |
|  | Zinc stearate | — | — | — | — | — | — | 10 |
|  | Zinc oxide | 5 | 5 | 5 | 5 | 5 | 5 | 5 |
|  | Zinc acrylate | 27 | 23 | 42 | 30 | 27 | 23 | 30 |
|  | Barium sulfate | *1) | *1) | *1) | *1) | *1) | *1) | *1) |
|  | Thionaphthol | 0.2 | 0.2 | 0.2 | 0.2 | 0.2 | 0.2 | 0.2 |
|  | Dicumyl peroxide | 0.8 | 0.8 | 0.8 | 0.8 | 0.8 | 0.8 | 0.8 |
| Core hardness distribution (JIS-C) | Core center hardness | 59.0 | 63.0 | 56.0 | 55.0 | 57.0 | 62.0 | 65.0 |
|  | 2.5 mm | 63.0 | 67.0 | 59.0 | 57.0 | 59.0 | 67.0 | 67.0 |
|  | 5.0 mm | 66.0 | 71.0 | 63.0 | 60.0 | 63.0 | 71.0 | 72.0 |
|  | 7.5 mm | 69.0 | 73.0 | 65.0 | 63.0 | 65.0 | 73.0 | 74.0 |
|  | 10 mm | 70.0 | 74.0 | 69.0 | 68.0 | 69.0 | 74.0 | 76.0 |
|  | 12.5 mm | 72.5 | 74.0 | 70.0 | 71.7 | 72.5 | 74.0 | 76.0 |
|  | 15.0 mm | 78.2 | 79.0 | 75.0 | 77.8 | 78.2 | 79.0 | 80.0 |
|  | 17.5 mm | 83.1 | 84.0 | 78.0 | 81.2 | 83.1 | 84.0 | 85.0 |
|  | Surface hardness | 88.0 | 86.0 | 84.0 | 86.9 | 89.0 | 85.0 | 86.0 |
|  | Surface hardness − center hardness | 29.0 | 23.0 | 28.0 | 31.9 | 32.0 | 23.0 | 21.0 |
|  | $R^2$ of approximated curve | 0.97 | 0.96 | 0.98 | 0.98 | 0.98 | 0.95 | 0.97 |
|  | Slope of approximated curve | 1.36 | 1.07 | 1.32 | 1.63 | 1.59 | 1.07 | 1.04 |
| Core coefficient of restitution | | 0.000 | 0.000 | −0.007 | 0.000 | 0.000 | 0.000 | 0.000 |
| Core compression deformation (mm) | | 3.32 | 3.30 | 3.39 | 3.34 | 3.33 | 3.31 | 3.3 |
| Intermediate layer hardness (Shore D) | | 65 | 65 | 65 | 65 | 65 | 65 | 65 |
| Intermediate layer thickness (mm) | | 1.0 | 1.0 | 1.0 | 1.0 | 1.0 | 1.0 | 1.0 |
| Cover hardness (Shore D) | | 32 | 32 | 32 | 32 | 32 | 32 | 32 |
| Cover thickness (mm) | | 0.5 | 0.5 | 0.5 | 0.5 | 0.5 | 0.5 | 0.5 |
| Evaluation | Workability | Good | Good | Poor | Good | Good | Good | Poor |
|  | Attachment to kneader | No | No | Yes | No | No | No | Yes |
|  | Compression deformation (mm) | 2.75 | 2.73 | 2.80 | 2.75 | 2.75 | 2.73 | 2.73 |
|  | Spin rate on driver shots (rpm) | −200 | −50 | −150 | −250 | −250 | −50 | 0 |
|  | Flight distance on driver shots (m) | 2.0 | 1.0 | −6.0 | 3.0 | 3.0 | 1.0 | 0.0 |

*1) As to an amount of barium sulfate, adjustment was made such that the golf ball had a mass of 45.4 g.

BR730: a high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3) available from JSR Corporation Zinc acrylate: "ZNDA-90S" available from Nihon Jyoryu Kogyo Co., Ltd.

Zinc oxide: "Ginrei R" manufactured by Toho Zinc Co., Ltd.

Barium sulfate: "Barium sulfate BD" manufactured by Sakai Chemical Industry Co., Ltd., adjustment was made such that the finally obtained golf ball had a mass of 45.4 g.

2-thionaphthol: available from Tokyo Chemical Industry Co., Ltd.

Dicumyl peroxide: "Percumyl (registered trademark) D" manufactured by NOF Corporation.

Zinc stearate: available from Wako Pure Chemical Industries, Ltd. (purity: 99%)

Basic zinc stearate: in the formula (1), $M^1=M^2=Zn$, R=17 carbon atoms

Basic zinc laurate: in the formula (1), $M^1=M^2=Zn$, R=11 carbon atoms

Basic zinc caprylate: in the formula (1), $M^1=M^2=Zn$, R=7 carbon atoms (2) Production of Cover Cover materials shown in Table 5 were mixed with a twin-screw kneading extruder to prepare the cover compositions in the pellet form. The extruding conditions of the cover composition were a screw diameter of 45 mm, a screw rotational speed of 200 rpm, and screw L/D=35, and the mixtures were heated to 160° C. to 230° C. at the die position of the extruder.

TABLE 5

|  |  | Cover composition No. | |
|---|---|---|---|
|  |  | 1 | 2 |
| Formulation (parts by mass) | Elastollan XNY85A | — | 100 |
|  | Surlyn 8945 | 50 | — |
|  | Himilan AM7329 | 50 | — |
|  | Titanium oxide | 4 | 4 |
| Slab hardness (shore D) |  | 65 | 32 |

Formulation: parts by mass

Formulation: parts by mass (3) Production of Golf Ball Body

The cover composition No. 1 obtained above was injection-molded onto the spherical cores to form an intermediate layer covering the spherical core (thickness: 1.0 mm). Subsequently, the cover composition No. 2 was injection-molded onto the intermediate layer to form an outermost cover layer (thickness: 0.5 mm), thereby preparing a golf ball. Upper and lower molds for the intermediate layer and outermost cover layer have a spherical cavity with pimples, a part of which serves as a hold pin which is extendable and retractable.

When molding the intermediate layer, the center was placed, held with the protruding hold pins in the mold, the intermediate layer composition heated to 260° C. was charged into the mold under a pressure of 80 tons within 0.3 seconds, and cooled for 30 seconds. Then the mold was opened and the cores were taken from the mold.

When molding the cover, the core was placed, held with the protruding hold pins in the mold, the cover composition heated to 260° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained.

As shown in Table 3 and 4, golf balls comprising a spherical core and at least one cover layer covering the spherical core, wherein the spherical core is formed from a rubber composition containing (a) as base rubber, (b) an α,β-unsaturated carboxylic acid having 3 to 8 carbon atoms and/or a metal salt thereof as a co-crosslinking agent, (c) a crosslinking initiator, and (d) a basic metal salt of a fatty acid were excellent in kneading workability. In addition, the golf balls had low spin rate and great flight distance on driver shots, respectively.

The present invention provides a golf ball traveling a great flight distance on driver shots. This application is based on Japanese Patent applications No. 2012-113568 filed on May 17, 2012, the contents of which are hereby incorporated by reference.

The invention claimed is:

1. A golf ball having a spherical core and at least one cover layer covering the spherical core, wherein the spherical core is formed from a rubber composition containing:
   (a) a base rubber,
   (b) an α,β-unsaturated carboxylic acid having 3 to 8 carbon atoms and/or a metal salt thereof as a co-crosslinking agent,
   (c) a crosslinking initiator, and
   (d) a basic metal salt of a fatty acid having 5 to 30 carbon atoms in an amount ranging from 0.5 part by mass to 30 parts by mass with respect to 100 parts by mass of (a) the base rubber.

2. The golf ball according to claim 1, wherein the rubber composition contains (d) the basic metal salt of the fatty acid in an amount ranging from 2.0 parts by mass to 25 parts by mass with respect to 100 parts by mass of (a) the base rubber.

3. The golf ball according to claim 1, wherein (d) the basic metal salt of the fatty acid is represented by a following general formula (1):

$$mM^1O \cdot M^2(RCOO)_2 \quad (1)$$

wherein m ranges from 0.1 to 2.0, RCOO represents a residue of the fatty acid, and $M^1$ and $M^2$ are metals of the Group II or Group XII of the periodic table, respectively.

4. The golf ball according to claim 1, wherein the fatty acid component of (d) the basic metal salt of the fatty acid is a fatty acid having 5 to 18 carbon atoms.

5. The golf ball according to claim 1, wherein the fatty acid component of (d) the basic metal salt of the fatty acid is a saturated fatty acid.

6. The golf ball according to claim 1, wherein the fatty acid component of (d) the basic metal salt of the fatty acid is at least one component selected from the group consisting of caprylic acid, lauric acid, and stearic acid.

7. The golf ball according to claim 1, wherein the metal component of (d) the basic metal salt of the fatty acid is magnesium, calcium, zinc or barium.

8. The golf ball according to claim 1, wherein (d) the basic metal salt of the fatty acid is a basic zinc salt of the fatty acid.

9. The golf ball according to claim 1, wherein the rubber composition further contains (f) an organic sulfur compound.

10. The golf ball according to claim 9, wherein (f) the organic sulfur compound includes at least one compound selected from the group consisting of thiophenols, diphenyl disulfides, thionaphthols, thiuram disulfides, or metal salts thereof.

11. The golf ball according to claim 9, wherein the rubber composition contains (f) the organic sulfur compound in a content ranging from 0.05 part by mass to 5 parts by mass with respect to 100 parts by mass of (a) the base rubber.

12. The golf ball according to claim 1, wherein the rubber composition contains (b) the α,β-unsaturated carboxylic acid having 3 to 8 carbon atoms and/or the metal salt thereof in a content ranging from 10 parts by mass to 50 parts by mass with respect to 100 parts by mass of (a) the base rubber.

13. The golf ball according to claim 1, wherein the rubber composition contains the metal salt of (b) the α,β-unsaturated carboxylic acid having 3 to 8 carbon atoms as the co-crosslinking agent.

14. The golf ball according to claim 1, wherein if JIS-C hardness values are measured at the core center, the core surface and at intervals of 2.5 mm from the core center, and the hardness values are plotted versus the distances from the core center, then $R^2$ of a linear approximate curve of the hardness distribution determined by the least-squares method is 0.93 or more.

15. The golf ball according to claim 1, wherein the spherical core surface hardness is greater than the spherical core center hardness by an amount ranging from 18 to 80 in JIS-C hardness.

16. The golf ball according to claim 1, wherein the fatty acid component of (d) the basic metal salt of the fatty acid is a saturated fatty acid having 5 to 18 carbon atoms.

17. The golf ball according to claim 3, wherein the fatty acid component of (d) the basic metal salt of the fatty acid is a saturated fatty acid having 5 to 18 carbon atoms.

* * * * *